United States Patent [19]

Hedges

[11] 4,414,499
[45] Nov. 8, 1983

[54] MOTOR PROTECTING IMPROVED ENERGY ECONOMIZER FOR INDUCTION MOTORS

[75] Inventor: Rhey W. Hedges, Ft. Lauderdale, Fla.

[73] Assignee: Dr. Louis W. Parker, Fort Lauderdale, Fla.

[21] Appl. No.: 311,122

[22] Filed: Oct. 14, 1981

[51] Int. Cl.³ ............................................. H02P 5/40
[52] U.S. Cl. ................................. 318/798; 318/729; 318/812; 318/806
[58] Field of Search ................................. 361/24–29, 361/31, 32; 318/729, 798, 812, 806

[56] References Cited

U.S. PATENT DOCUMENTS

| | | | |
|---|---|---|---|
| 3,965,396 | 6/1976 | Tyler et al. | 361/24 |
| 4,021,700 | 5/1977 | Ellis-Anwyl | 361/24 |
| 4,084,406 | 4/1978 | Brenneman | 318/798 |
| 4,176,307 | 11/1979 | Parker | 318/798 |
| 4,286,303 | 8/1981 | Genheimer et al. | 361/24 |
| 4,298,834 | 11/1981 | Opfer | 318/729 |
| 4,319,298 | 3/1982 | Davis et al. | 361/24 |

FOREIGN PATENT DOCUMENTS

WO80/02895 12/1980 World Intel. Prop. Org.

Primary Examiner—David Smith, Jr.
Attorney, Agent, or Firm—Pollock, Vande Sande & Priddy

[57] ABSTRACT

A standard, unmodified AC induction motor has its stator winding energized from a sine wave source through a signal-responsive wave modifier operative to control the portion of each cycle of the sine wave which is coupled from said source to the stator winding. An improved motor current demodulator, responsive to efficiency-related parameters and excessive stator winding inrush current each time said current increases from zero, produces signals for controlling the wave modifier, thereby to maintain optimum motor efficiency with varying motor loads and power source variations, and the signals also control a motor protector circuit which inhibits said wave modifier thereby to deenergize said stator winding under excessive input current conditions, excessive motor temperature or a potentially damaging combination thereof.

15 Claims, 8 Drawing Figures

FIG.3a STATOR POWER, ZERO LOAD

FIG.3b TRANSISTOR 34, CONDUCTION

FIG.3c STATOR POWER, 1/2 MAX. LOAD

FIG.3d TRANSISTOR 34, CONDUCTION

FIG.3e STATOR POWER, MAXIMUM LOAD

FIG.3f TRANSISTOR 34, CONDUCTION

MOTOR PROTECTING IMPROVED ENERGY ECONOMIZER FOR INDUCTION MOTORS

BACKGROUND OF THE INVENTION

The present invention comprises an improvement in the energy economizing AC power control system described in Hedges U.S. Pat. application Ser. No. 165,574, filed July 3, 1980, now U.S. Pat. No. 4,297,628 issued Oct. 27, 1981, for "Energy Economizer for Induction Motors", the disclosure of which is incorporated herein by reference.

When a conventional induction motor is operating below its full rated load or under conditions of higher than normal stator voltage, a fraction of the sine wave voltage would satisfy the actual load requirement imposed on the motor. Such cutting in part of the sine wave voltage would result in considerably less iron and copper losses and less heating of the stator. The resultant low operating temperature further reduces the copper losses in the motor due to lowered ohmic resistance. These factors combine to effect a significant reduction in the energy which is consumed by the induction motor, with a consequent conservation in available energy sources and reduction in motor operating costs.

The energy economizer of the aforementioned Hedges Patent application is based upon a recognition of the foregoing factors, and provides a simple yet reliable mechanism operative to cause the electrical energy supplied to the stator and the stator flux density of a standard-unmodified-AC induction motor to become a function of its operating efficiency or load demand at any given moment. The prior Hedges invention accomplishes this by permitting a greater or smaller portion of the sine wave of voltage from a power source to enter the stator as a function of operating efficiency-related characteristics of stator inrush current during each alternation. In other words, the sine wave of the voltage supplied to the motor's stator is modified to suit existing load and AC power source conditions. This results in the reduction of iron and copper losses.

The prior Hedges invention, however, affords no protection to a controlled motor under adverse conditions of excessive overloads or temperature and, additionally, may actually decrease reliability of motor system operation. For example, substantially higher stator current under said conditions severely overloads an economically-sized solid state AC power switch, e.g., a Triac, with adequate power rating for normal motor operation, before causing permanent damage to the motor. Using an over-sized AC power switch to accommodate excessive stator current would be a cost and space penalty that merely guarantees the referenced energy-saving invention could couple sufficient power to permanently damage the motor under, for example, a stalled rotor condition. The present invention increases motor system reliability by preventing catastrophic failure of the motor or an economically-sized solid state switch under said adverse conditions at a lesser cost than would be required for an oversized AC power switch assembly.

The improvement of the present invention is characterized by increased stability and function of the motor efficiency/load demand monitoring means disclosed in the aforementioned Hedges patent, and the addition of a motor protector circuit. The motor protector utilizes a stator current-related signal developed by the improved monitoring means to activate low-cost solid state means which inhibits application of stator input power under stalled-rotor or severe overload conditions; this reliably protects both the motor and the electronic energy-saving control means. Additionally, said protector means may be utilized to further protect the motor by likewise inhibiting application of stator input power when associated temperature sensors in physical contact with the controlled motor detect a condition of motor heating above a preselected temperature. As will be described, the present invention realizes the energy-saving results of the prior Hedges invention under more adverse circumstances and with improved stability under all conditions, prevents catastrophic motor system failure due to excessive stator current and, further, affords additional motor protection by automatically removing stator power if motor temperature rises above a preset, safe operating level for any reason (e.g., poor ventilation).

SUMMARY OF THE INVENTION

A standard AC induction motor has its stator winding energized from a sine wave power source through a wave modifier operative to vary the portion of each cycle of said sine wave which is coupled from the source to the stator winding. Said wave modifier may be of either type described in the aforementioned Hedges patent and, in accordance with the present invention, is subject to turn off by added circuit means responsive to excessive stator current or physical heating of the controlled motor. Said added circuit means cooperates with the wave modifier to provide protective action with standard, unmodified induction motors.

Efficiency monitoring circuit means are employed in the present invention comprising a stator current monitoring circuit that is operable at all speeds, including stalled rotor conditions, and a demodulating circuit that, above about 95% of synchronous motor speed, responds to particular characteristics of stator input current that, during the first few hundred microseconds after current zero crossings, are proportional to the efficiency with which the motor is converting electrical energy to mechanical energy. The characteristics of major significance in the present motor protection arrangement is the magnitude and rise time of stator inrush current at the beginning of each current alternation. Said inrush current characteristics are relatable to:

1. motor load when the motor is running efficiently
2. instances of severe overload, or
3. a stalled rotor condition The aforementioned efficiency monitoring circuit may be magnetically coupled to either one of the input power lines of a single phase stator winding and may be located physically near or remote from the controlled motor. The output of said circuit consists of a DC voltage whose magnitude becomes load proportionally controlling of the wave modifier if the power source provides (rated) nominal voltage and the load applied to a running motor varies between zero and maximum rated load, or if the power source provides higher than nominal voltage, a condition which, if uncontrolled, would cause a decrease in the efficiency of a running motor at any load condition, including moderate overloads.

In other words, the DC voltage output of the efficiency monitoring circuit employed in the present invention automatically becomes a DC control signal that acts upon and through the wave modifier thereby to control the application of partial or complete sine waves of voltage to the motor stator under any combination of load between zero and maximum rating and applied source voltage that would otherwise cause conversion of electrical energy to mechanical energy to occur at less than the maximum inherent efficiency peculiar to said motor. Demodulation of the efficiency-related modulation of stator inrush current to control signal pulses may be accomplished by a pulse amplifier circuit arrangement with particular nonlinear characteristics. Conversion of the demodulated inrush current to said DC control signal may be accomplished by AC coupling the output of said pulse amplifier to an improved signal biased DC amplifier that becomes controllingly operative at a particular most energy-efficient inrush current modulation resultant peculiar to a motor.

Improvement to said DC amplifier comprises addition of circuit means whose time-constant characteristics vary in accordance with the rate of change in, as well as the magnitude of, motor mechanical load. Specifically, the integration time constant is substantially longer than that employed in the aforementioned prior Hedges system at light to moderate loads and when the motor load changes slowly, yet automatically decreases substantially when the rate-of-change increase in load exceeds a predetermined rate. The variable time constant arrangement significantly increases system stability in the face of amplitude fluctuations or momentary loss of the AC power source voltage to a controlled motor. Said voltage variations, often cyclical, are a relatively common occurrence in, for example, manufacturing environments where a variety of motor-driven industrial machinery share common power lines; likewise momentary power service interruptions are not uncommon. Additionally, system stability with low inertia motor loads at light to moderate levels is increased without decreasing the non-stalling response to sudden heavy load increases specified in the aforementioned prior Hedges patent due to said time constant decrease under such conditions.

Thus, by reference to the magnitude and rate of change of the aforementioned particular inrush current modulation resultant, said DC amplifier operates to reduce the magnitude of said DC control voltage when said modulation resultant is indicative of overpowered operations, and operates with a variable time constant to increase the magnitude of said DC control voltage when said modulation resultant is indicative of underpowered operation. In other words, the magnitude of input power coupled to the motor from a sine wave power source is cooperatively controlled by the average motor operating efficiency and the rate-of-change increase in motor load at any given moment as necessary to provide stable, non-stalling motor operation under normal or extreme conditions of variable load and AC source voltage fluctuations.

The wave modifier described hereinafter by reference to FIG. 2 of the drawings is in the form shown in FIG. 3 of Parker et al. U.S. Pat. No. 4,190,793. With said modifier arrangement, the aforementioned DC control signal ultimately controls the closure of a full wave solid state power switch, such as a Triac, that is disposed between the sine wave power source and the motor stator so that the portion of the sine wave which is coupled to the motor stator and, accordingly, the field density of the stator winding varies within the variations in the load on the motor.

BRIEF DESCRIPTION OF THE DRAWINGS

The foregoing objects and advantages, construction and operation of the present invention will become more readily apparent from the following description and accompanying drawings wherein.

DESCRIPTION OF THE PREFERRED EMBODIMENTS

Figure 1:
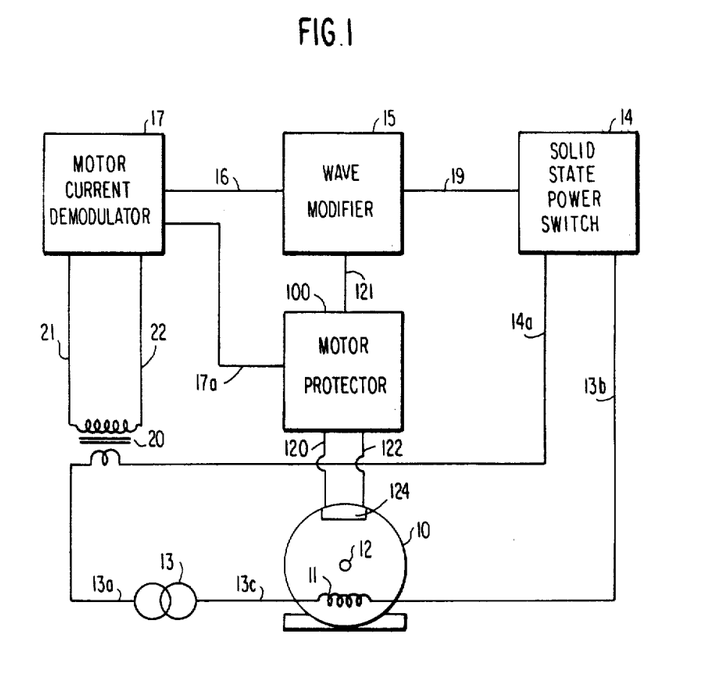
FIG. 1 is a block diagram of a variable field induction motor system constructed in accordance with the present invention.
Figure 2:
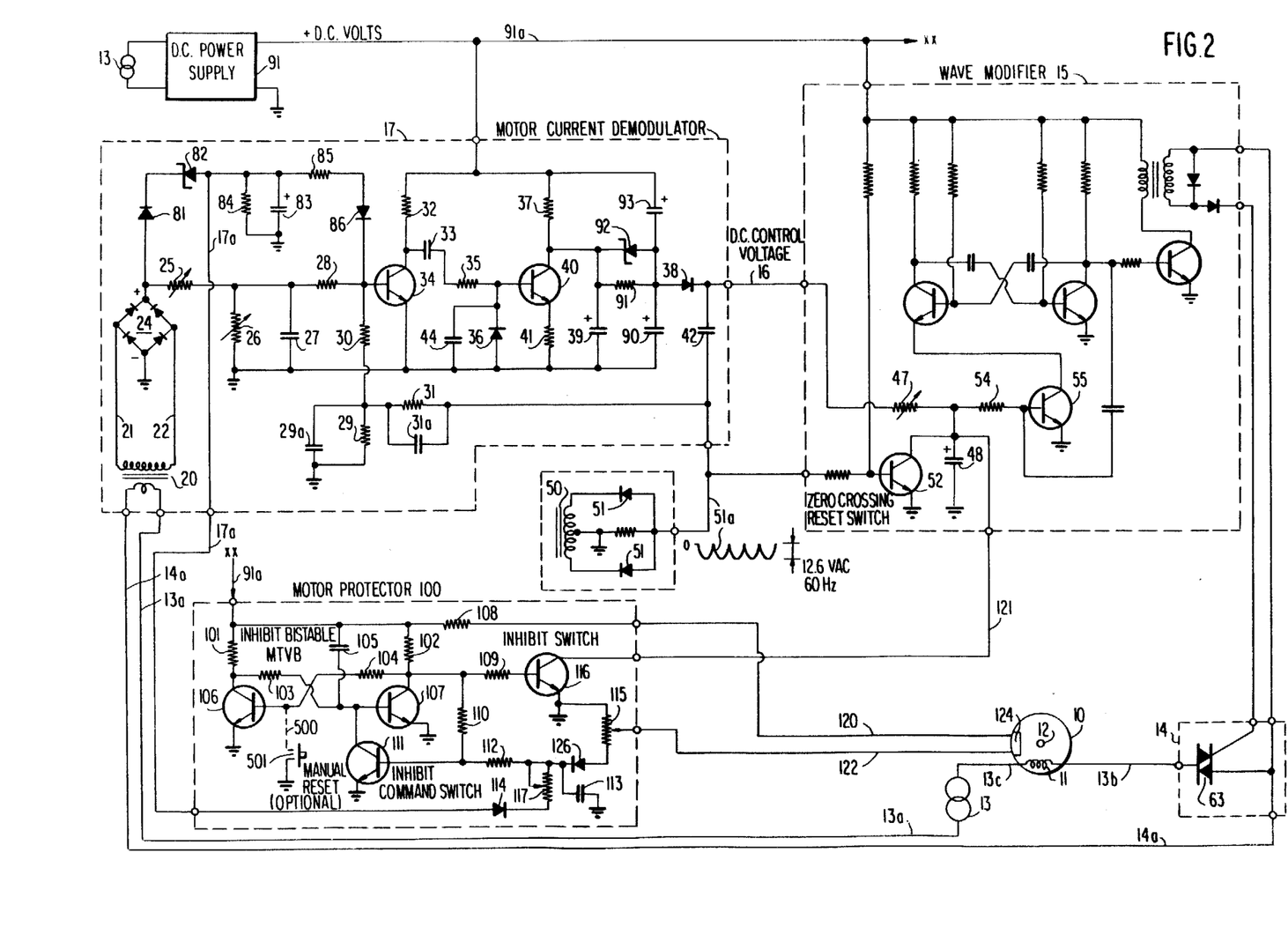
FIG. 2 is a schematic drawing of one embodiment of the motor system shown in FIG. 1.

Referring to FIGS. 1 and 2, like numerals of which refer to like elements, a standard AC induction motor 10 is provided with a stator winding 11 and a rotor having a shaft 12 adapted to be coupled to a load. One side of an AC power source 13 is coupled to one side of stator winding 11, e.g., as shown by solid line 13c. The other side is coupled via line 13a into one side of the primary of transformer 20, the other side of which is coupled via line 14a to solid state switch 14, and from solid state switch 14 output via line 13b to the other side of stator winding 11, thereby to effect and control the rotation of rotor shaft 12.

Switch 14 may comprise, for example, a Triac assembly, or a silicon controlled rectifier assembly, and, as shown in FIG. 1, switch 14 is regulated by a wave modifier 15. Wave modifier 15 is in the form shown in Parker et al U.S. Pat. No. 4,190,793. The operation of wave modifier 15 is controlled by a DC control voltage appearing on line 16 at the output of a motor current demodulator 17, which control voltage is, under certain conditions, a function of the load on or operating efficiency of motor 10.

More particularly, and as noted above, the primary of saturable core transformer 20 is connected in series with one of the stator input power lines, such as 13a as shown in FIG. 1. A voltage pulse of relatively short duration derived from stator 11 initial inrush current passing through said primary, is generated across the secondary of transformer 20 each time said inrush current reverses its direction of flow and said voltage pulse is coupled via lines 21 and 22 to a full wave diode bridge 24 (FIG. 2) in motor current demodulator 17. The various individual parameters of said voltage pulses, such as their amplitude, rise time, duration and absolute time of occurrence, vary in proportion to the characteristics of transformer 20, the magnitude and wave form of the applied voltage, the momentary mechanical load on the motor, motor speed and the inherent electro-mechanical properties peculiar to the motor.

The energy saving operation of the aforementioned prior Hedges invention will now be briefly reviewed with reference to FIG. 2. Generally speaking, demodulator 17 comprises an adjustable circuit that employs a control signal reference developed from a particular combination of the aforementioned variable parameters which occur when motor 10 is operating near maximum inherent energy efficiency. This establishes particular stator inrush current characteristics as an energy-efficiency reference.

When the motor is running, and demodulator 17 has been adjusted to couple minimum motor input power at, for example, zero load, the aforementioned stator inrush current parameter modulation becomes proportional to the magnitude of subsequently applied loads. Thus, the pulse parameter modulation appearing in the secondary of transformer 20 is converted by motor current demodulator 17 to a corresponding magnitude of DC control signal on line 16 that is proportional to subsequent motor efficiency and/or to the particular motor load applied above the energy-efficient zero load reference at all loads above zero load. More particularly, demodulator 17 increases or decreases said DC control signal when the stator inrush current characteristics indicate decreased operating efficiency due to under or over-powered motor operation regardless of whether said conditions are a result of a change in rotor load or magnitude changes of the sine wave voltage supplied by AC power source 13. In other words, demodulator 17 responds in a controlling sense to a decrease in operating efficiency regardless of the cause of said decrease.

For the present, it suffices to note that the DC control voltage on line 16, when coupled to wave modifier 15, ultimately energizes the gate electrode of solid state power switch 14 for a predetermined portion of time of each cycle from AC power source 13. The duration of switch 14 energization during each alternation of power source 13, as controlled by the wave modifier 15, is a function of the magnitude of the DC control signal on line 16 and, due to the operating efficiency reference established near synchronous rotor speeds, said control signal becomes a function of the mechanical load imposed on the motor when power source 13 supplies a steady nominal voltage. When the wave modifier 15 takes the form shown in FIG. 2, the gate electrode energization of Triac 63 consists of a train of current pulses provided by a gate trigger generator. The gate electrode energization is coupled to said gate to turn on said Triac for a corresponding time portion of each cycle from AC power source 13. As a result, a greater or smaller portion, or even a complete cycle, of each voltage cycle from power source 13 is coupled via connection 13b to stator winding 11 of motor 10, as a function of the load on the motor. When the load increases, therefore, the stator magnetic field density of the motor similarly increases; and, when the load on the motor decreases, the magnetic field density of the stator is decreased.

A preferred circuit operating in the fashion described above is shown in FIG. 2. For purposes of the subsequent description, it is assumed that AC induction motor 10 is a single phase induction motor, and the circuit of FIG. 2 shows how the stator flux density can be controlled as a function of the motor load or motor operating efficiency in that single phase and how the motor is protected from excessive current or temperature. Polyphase motors can be made to operate in similar fashion by connecting motor current demodulator 17 into one of the several phases and coupling the output of demodulator 17 to separate wave modifiers which control the energization of two of the three phases in a three phase motor. An arrangement of this general type, employing two wave modifiers which are responsive to a single motor load detection means to provide load-related control of the AC power in only two of the three phases of a three phase induction motor, is described in my prior U.S. Pat. No. 4,242,625 issued Dec. 30, 1980, for "Energy Economizer for Polyphase Induction Motors."

The operation of the input circuitry to the motor current demodulator 17 of prior Hedges U.S. Pat. No. 4,297,628 will now be reviewed briefly. Transformer 20 is provided with a core of magnetic material that saturates at a substantially lesser current magnitude than that which flows through stator winding 11 when motor 10 operates with maximum efficiency at zero load. The waveform of the voltage developed in the secondary of transformer 20 consists of a relatively short duration pulse (microseconds) each time the stator current increases from zero. The precise width and other parameters of said voltage pulses at any given stator current zero crossing are proportional to several factors, among which are the magnitude and waveform of the stator inrush current, the magnitude of the motor load, and the efficiency with which motor 10 is converting electrical energy to mechanical energy. In other words, the parameters of the voltage pulses appearing in the secondary of transformer 20 are proportional to the nature of said transformer and various characteristics of current flowing in stator winding 11 which naturally vary in accordance with the waveform of the applied voltage, the motor load, rotor speed and the inherent properties of induction motors. Thus, when demodulator 17 is adjusted to cause motor 10 to operate at maximum possible efficiency, the then existing parameters of said voltage pulses comprise a particular efficiency reference that corresponds specifically to a condition of efficiency regardless of the particular magnitude of motor load.

The secondary winding of transformer 20 is connected by lines 21 and 22 to a diode bridge 24 whose negative output terminal is grounded. The output of bridge 24, therefore, consists of positive voltage pulses regardless of the actual flow direction of stator inrush current. The voltage pulse amplitude in the secondary of transformer 20 induced as a function of the magnitude of stator current is, in effect, a signal representative of said magnitude. This parameter of said voltage pulses is used in the present invention to activate circuit means to protect the motor from prolonged excessive stator current caused by severe overloading or a stalled rotor condition.

The positive output of bridge 24 is connected to variable resistor 25 which serves as the input to the active circuit elements of current demodulator 17, and is also connected by diode 81 to the cathode of zener diode 82. Improvements to demodulator 17 will be described later. Circuit means 81-86 are described in the aforementioned Hedges U.S. Pat. No. 4,297,628, and cause demodulator 17 to quickly increase the AC power coupled to the stator winding 11 of motor 10 when a heavy load is suddenly applied to a zero or lightly loaded motor. Said circuit means 81-86 responds to voltage pulse amplitudes in the output of bridge 24 that exceed the conduction threshold of zener diode 82. Said threshold is selected to be a higher voltage than the peak amplitude of the pulse output of bridge 24 when a controlled motor is operating efficiency at rated loads. Thus, voltage pulses appear on the anode of zener diode 82 only when the stator inrush current magnitude is higher than when the motor is running efficiently and have an amplitude proportional to said current magnitude.

As shown in FIG. 2, and in accordance with one of the improvements of the present invention, a line 17a connects the anode of zener diode 82 to one input of motor protector 100. The excessive stator current proportional pulses referred to above are used in the present invention under certain conditions to inhibit wave modifier 15 and, thereby, remove input power from the motor stator 11. For reasons described below, the circuit arrangement of motor protector 100 is not activated by the naturally high starting current of induction motors and likewise permits operation with rated overloads. However, prolonged severe overloads or a stalled rotor condition that would ultimately damage the motor or solid state power switch 14 are prevented.

Motor protector 100 consists of an inhibit command switch transistor 111, which, under certain conditions, triggers an inhibit bistable multivibrator comprising transistors 107 and 106, whose output controls an inhibit switch transistor 116 which in turn controls operation of wave modifier 15, thereby to enable or inhibit the coupling of AC power source 13 to motor stator winding 11 by solid state switch 14.

Transistor 111 is, in effect, a two-input gate wherein one input consists of positive voltage pulses proportional in amplitude to higher than normal stator current coupled from current demodulator 17 via line 17a; and the other input, appearing on line 122, is a positive voltage proportional to motor temperature monitored by temperature sensor 124. Transistors 106 and 107 with associated resistors 101, 102, 103 and 104 comprise a conventional bistable multivibrator. Capacitor 105 serves to insure that when power is first applied, said multivibrator assumes a condition wherein transistor 107 is conducting and transistor 116 is held in a cut-off state. This assures enabled operation of wave modifier 15 when AC power is first applied to the controlled motor and, additionally, provides an automatic reset function after inhibit activation by either input to inhibit command switch 111. That is, the motor protector 100 may be reset by turning the main system power switch off, then on, after inhibit operation by either input. The base of transistor 106 may be connected, e.g. as shown by broken line 500, to a normally open manual reset switch 501; this illustrates the ease of providing an optional manual reset function to motor protector 100.

When transistor 111 is connected by either input to its inhibit state, it clamps the forward bias of transistor 107 to ground by collector-to-grounded-emitter conduction. This forces transistor 106 of the multivibrator into conduction; it will remain conducting until power is removed and re-applied or until the bistable multivibrator is manually reset by switch 501. When transistor 107 is cut-off, its collector voltage rises toward power supply plus due to resistor 102, one end of which is connected to line 91a of the power supply 91. Said positive going voltage is coupled by resistor 110 to the base of transistor 111, which accelerates multivibrator switching action, and to the base of transistor 116 by resistor 109. The voltage coupled to transistor 116 is forward bias causing transistor 116 to clamp the plus terminal of capacitor 48 in wave modifier 15 to ground by collector-to-grounded-emitter conduction. This action inhibits operation of wave modifier 15 which, in turn, prevents turn on of solid state switch 14 during the next alternation of AC power source 13.

As previously noted, there are various normal operating conditions whose stator current is, for brief periods, substantially higher than when the motor is running efficiently at rated loads. During induction motor starting, for example, stator current is several times normal running current even when the rotor has no mechanical load; it is higher for a longer period during starting when coupled to a maximum rated load. The arrangement of motor protector circuit 100 therefore includes adjustable circuit means to provide a time-delayed inhibit response to higher than normal stator currents. More particularly, referring still to FIG. 2, line 17a is coupled by isolating diode 114 to a pulse integrating network consisting of variable resistor 117 and capacitor 113. Resistor 117 may be adjusted so that motor protector 100 does not inhibit wave modifier 15 until stalled rotor current flows for a selected time period, for example, approximately 0.5 seconds. As a result, catastrophic failure of solid state switch 14 or the stator winding 11 may be avoided, but operation of the motor within its ratings is not impaired.

Resistor 108, potentiometer 115, temperature sensor 124 and isolating diode 126 comprise a further circuit which permits motor protector 100 to be controllingly responsive to excessive motor temperature. In the arrangement of FIG. 2, temperature sensor 124, installed in or attached to motor 10, could be, for example, a thermistor of high resistance and negative temperature coefficient. Positive voltage from the power supply 91 is coupled by current limiter resistor 108 to the movable arm of potentiometer 115 through thermistor 124 via lines 120 and 122. In this embodiment, potentiometer 115 acts as the lower section of a voltage divider. In other words, the voltage coupled by diode 126 to capacitor 113 and the input of transistor 111 by resistor 112 is a function of the position of the movable arm of potentiometer 115 and the combined resistance of resistor 108 and thermistor 124. Thus, as motor temperature increases and the resistance of thermistor 124 decreases, positive voltage coupled to the base of inhibit command transistor 111 will increase until said voltage reaches a forward bias level sufficient to cause conduction of inhibit command transistor 111. Conduction of transistor 111 inhibits wave modifier 15 in the manner previously described, and power is removed from stator winding 11 thereby preventing further heating of motor 10. When motor 10 has cooled sufficiently, motor protector 100 can be reset automatically, or manually as previously described.

Although motor protector 100 will operate effectively with either input alone, motor protection is substantially enhanced by employing both excessive stator current and motor temperature monitoring. This is because the positive voltage of both inputs is additively accumulated on capacitor 113. Thus, for example, if motor temperature is unusually high due to poor ventilation, the degree and time duration of motor overload current required to activate motor protector 100 is decreased accordingly. Likewise, prolonged overload current that is inadequate alone to trigger transistor 111 will activate motor protector 100 if the temperature of motor 10 increases as a result of said overload and closely approaches the selected (by potentiometer 115) protection temperature.

Referring to FIGS. 2 and 3, the operation of the current demodulator 17 of the aforementioned Hedges U.S. Pat. No. 4,297,628 will now be reviewed to facilitate an understanding of the improvement of the present invention. It should be understood in this respect that the various numerals used to identify components in FIG. 2 are the same as those employed to identify corresponding components in said Hedges patent, and reference is accordingly made to said Hedges patent for a further description of various of said components and their operations. Briefly stated, the very short (microseconds) positive pulse output of bridge 24 induced by stator inrush current during each power source alternation is converted by the input circuitry of pulse amplifier 34 to a substantially longer (milliseconds) positive output pulse in the collector of transistor 34 in response to all but abruptly applied rotor load increases. More particularly, the width of said output pulse is caused to vary in accordance with rotor loads when the motor is running, its width being maximum at zero load and minimum at maximum load as shown in FIGS. 3b and 3f respectively.

Figure 3A:
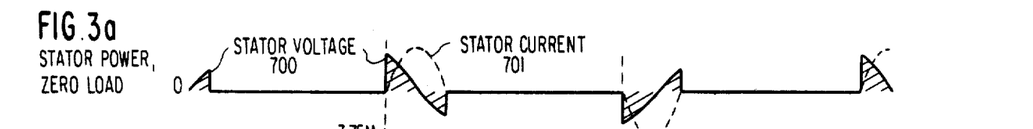
FIGS. 3a, c and e are a series of waveforms showing stator current and voltage relationship for a typical induction motor under various rotor mechanical load conditions when energized by an input power control system constructed in accordance with the present invention.
Figure 3B:
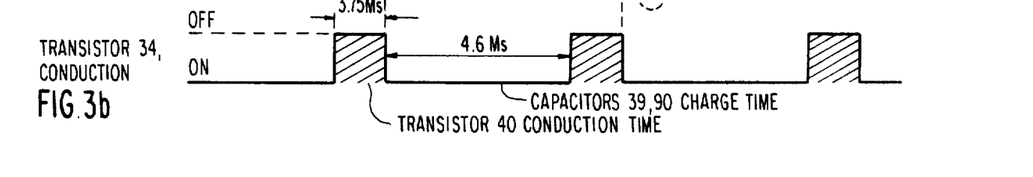
FIGS. 3b, d and f relate a particular aspect of the prior Hedges invention and present invention to stator inrush current parameters under said load conditions.
Figure 3C:
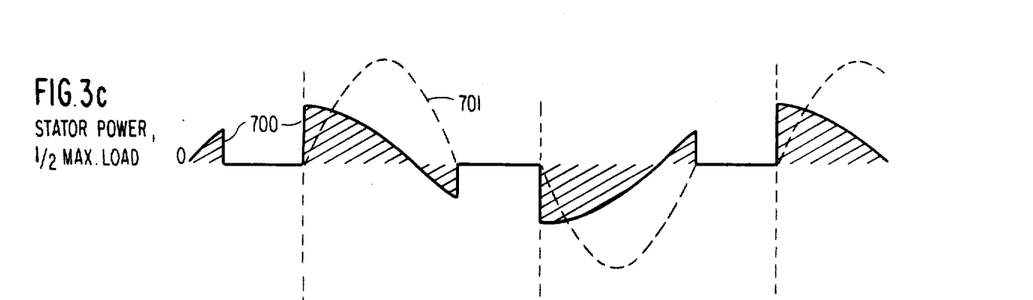
Figure 3D:
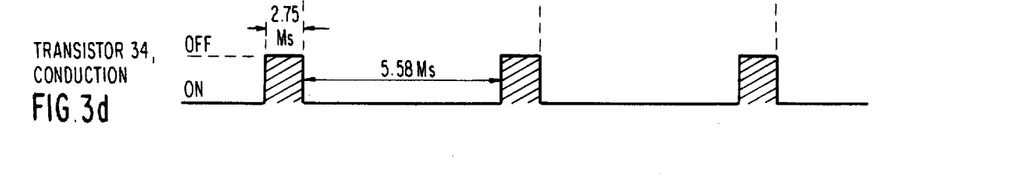
Figure 3E:
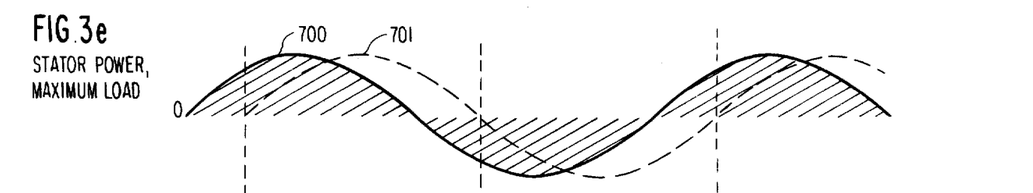
Figure 3F:
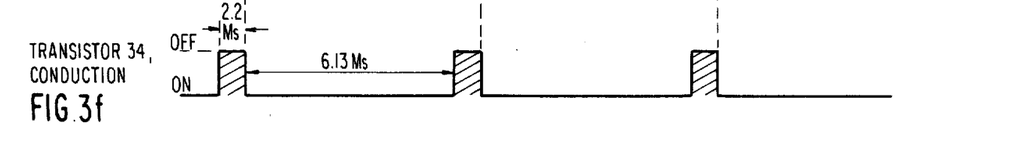

The operation of transistor 34 (illustrated by FIGS. 3b, d and f) is responsive to a resultant bias developed from two inputs:

1. forward bias derived from parameter modulation of stator inrush current as a function of motor load or efficiency and power source voltage amplitude at the moment of Triac 63 turn on (illustrated by FIGS. 3a, c and e), and
2. reverse bias in the form of full-wave rectified power source voltage alternations supplied on line 51a whose magnitude varies in accordance with the sine curve nonlinearily of said source voltage alternations.

The form of said reverse bias opposes nonlinearity of said inrush current that is unrelated to motor load which results from the sine wave form of AC power source 13 voltage. The net effect of said two bias inputs is cancellation of said load unrelated nonlinearity whereby the conduction time of transistor 34 is responsive to a resultant bias that is essentially proportional to efficiency or load-related parameters of stator inrush current at every moment.

The load-variable pulse width output of transistor 34 controls the conduction time of signal-biased DC amplifier 40 and, thereby, the average positive DC voltage charge on capacitor 39. In other words, capacitor 39 discharges to ground via collector-emitter conduction of transistor 40 in accordance with said pulse width through resistor 41 and, between said input pulses from transistor 34, capacitor 39 charges toward power supply plus through resistor 37, one end of which is connected to line 91a of the power supply. The value of resistor 37 is large compared to resistor 41; therefore, the average voltage on capacitor 39 becomes a fraction of the power supply voltage when transistor 40 conducts in response to transistor 34 pulses. Said average charge on capacitor 39 is coupled through diode 38 to line 16, which is the DC control voltage input to wave modifier 15. Because the pulse width coupled from transistor 34 which causes transistor 40 conduction is greatest at zero load and decreases in accordance with load increase, the charge on capacitor 39 and said DC control voltage on line 16 increase proportionately with rotor load increases.

To achieve closed loop control system stability with the relatively slow information rate of 120 Hertz (realized with a 60 Hertz AC power source), the integration time constant of resistor 37 and capacitor 39 must be long, e.g., in excess of 1 second. This conflicts, however, with the tenths of a second rate of increase in DC control voltage input to wave modifier 15 required for non-stalling AC power increase when motor 10 is subjected to a step-function (i.e., abrupt) load increase; especially if applied when motor 10 is running with a zero or light load. In the prior Hedges invention, a substantially faster rate of DC control voltage increase is effected by components 81–86 in the input to transistor 34. Briefly stated, when motor 10 is subjected to an abrupt load increase, a portion of the substantially higher voltage pulses induced by a sudden increase in stator inrush current is converted and coupled by said components as additional forward bias to transistor 34 for a time period related to the time their magnitude exceeds the conduction threshold of zener diode 82. Transistor 34, therefore, remains conducting during said time period which may be equal to several cycles of AC power source 13, and transistor 40 (receiving no pulse inputs) does not conduct. Under this condition, the charge on capacitor 39 rises at a rate determined by the RC time constant of resistor 37 and capacitor 39. Full sine waves are coupled to stator 11 by wave modifier 15 when the DC control voltage on line 16 is a fraction of DC power supply 91 source voltage; thus capacitor 39 reaches said fractional level in tenths of a second when transistor 40 is non-conducting, i.e., substantially faster than when transistor 40 is conducting in response to the 120 Hertz pulse-rate output of transistor 34.

Operation of systems constructed in accordance with the aforementioned Hedges U.S. Pat. No. 4,297,628, using a variety of motors, confirms that substantial energy savings is effected under the majority of actual working conditions. However, it has been determined that said system fails to achieve optimum energy savings under certain adverse conditions, e.g., cyclic fluctuations or brief interruptions of AC power source 13 voltage, especially in simultaneous combination with cyclic, minor load variations when motor 10 is operating at light-to-moderate load levels. More particularly, for optimum energy savings and system stability under said conditions, the closed loop AC power control system requires a substantially long response-to-stator-inrush-current-change time constant; ideally measurable in seconds. Increasing the integration time constant of resistor 37 and capacitor 39 in the collector circuit of transistor 40 will satisfy this requirement. However, such action prevents rapid system response to heavy, sudden load increases which, as previously mentioned, must be in tenths of a second to prevent excessive rotor speed loss.

In view of the foregoing, the present invention provides improvements to current demodulator 17, which will now be described by reference to FIG. 2. Said improvements make additional use of information naturally available in the output of transformer 20. That is, added components are provided which cause demodulator 17 to become more controllingly responsive to parameter changes of the voltage pulse output of bridge 24 induced by stator inrush current.

Briefly stated, a first improvement consists of the addition of capacitor 90, resistor 91 and zener diode 92 in the collector output circuit of transistor 40 as shown in the drawing. These additional components, cooperating with those specified in the prior Hedges patent, cause the closed loop AC power control system response time to rotor load changes to vary as a function of rotor load magnitude and load-change-rate increase in said rotor load. More particularly, said components, in cooperation with the existing components, form a two section integrator wherein the fixed time constant of the existing first section, resistor 37/capacitor 39, is followed by a second section time constant of resistor 91/capacitor 90 which may be varied by conduction of zener diode 92 connected in parallel with resistor 91.

In a model constructed in accordance with the above improvement, for example, resistor 91 was twice the value of resistor 37, capacitor 90 was twenty times the value of capacitor 39, and zener diode 92 had a conduction threshold of 2.7 volts. The following integration times with different rates of load increase to maximum motor ratings were observed:

1. with slow load-rate increases (seconds), zener diode 92 does not conduct and the integration time is long since it is a function of the cascaded RC time constants of resistor 37/capacitor 39 and resistor 91/capacitor 90.
2. with a moderately fast (tenths of a second) increase, zener diode 92 conducts during portions of each power source alternation, decreasing the time constant of resistor 91 and capacitor 90 and thereby proportionately decreasing the total integration time constant in the output of transistor 40.
3. with a step-function (thousandths of a second) load increase, wherein transistor 34 is rendered nonconducting for a load-related time period equal to several alternations of the power source, zener diode 92 conducts nearly continuously during said period and the total time constant is radically decreased, essentially becoming the time constant of resistor 37 and capacitor 90 (since the value of capacitor 39 is 1/20th of capacitor 90).

The basis for conduction of zener diode 92 which decreases current demodulator 17 integration time will now be examined in greater detail.

Because the time constant of resistor 91/capacitor 90 is considerably longer than resistor 37/capacitor 39 (in the previous example approximately 44 times greater), the voltage charge on capacitor 39 can rise much faster than the charge on capacitor 90. Thus, during sudden, heavy load increases when transistor 40 is non-conducting for several power source alternations, the charge on capacitor 39 quickly rises 2.7 volts higher than the charge on capacitor 90 to the conduction threshold of zener diode 92; it therefore conducts around resistor 91, effectively paralleling capacitors 39 and 90. There are less extreme load-change conditions which also caused zener diode 92 conduction thereby preventing significant rotor speed loss and decrease in motor efficiency. This action relies upon the positive feedback characteristics of the closed loop control system.

More specifically, of rotor speed begins to decrease due, for example, to sagging source voltage simultaneously occuring with a moderate load increase, the amplitude of the voltage pulse output of bridge 24, due to increased stator current, will ultimately exceed the conduction threshold of zener diode 82. Forward bias to transistor 34 will thus be increased during each alternation, proportionately decreasing the pulse width coupled by transistor 34 to transistor 40. This in turn causes a decreased time of transistor 40 conduction (and therefore the discharge of capacitor 39), thus allowing capacitor 39 to charge to a higher level during each alternation. If the 2.7 volt conduction threshold of zener diode 92 is reached during a small portion of each alternation under this condition, the increase of DC control voltage on line 16 is accelerated as previously described. Further, if said additional forward bias resulting from rotor speed loss completely suppresses pulse output of transistor 34 for one or more power source alternations, the substantially longer charge time of capacitor 39 resulting therefrom will cause conduction of zener diode 92 more quickly and for a longer time period. Thus, in this latter instance, the increase of DC control voltage will be more rapid than the previous example. In other words, if optimum rotor speed begins to decrease, for whatever reason, the closed loop AC power control system response time is faster because the time constant of the improved current demodulator 17 decreases as a function of said speed decrease.

To summarize, by providing a system response time constant that automatically adjusts to rotor requirements, the first improvement described above optimizes energy saving and provides increased system stability under adverse conditions, including uncontrollable conditions of input AC power source voltage fluctuations and/or momentary power service interruptions.

A second improvement to the current demodulator 17 consists of the addition of capacitor 93 between line 91a, i.e. power supply plus, and the junction of the ungrounded terminal of capacitor 90 and the anode of diode 38. This additional component insures that wave modifier 15 immediately couples full power to stator 11 of motor 10 when AC power source 13 is simultaneously applied to solid state switch 14 and DC power supply 91. More specifically, when AC power is thus applied, capacitor 93 provides a low resistance charging path for capacitor 90. This avoids a start-up delay in the increase of DC control voltage coupled to line 16 via diode 38 that would otherwise be introduced by the long time-constant circuitry in transistor 40's collector circuitry added by said first improvement.

A third improvement consists of providing the aforementioned connection 17a from the anode of zener diode 82 which provides an excess stator current signal input to motor protector 100.

Returning now to the operation of the overall system, when the stator 11 of the induction motor 10 is connected to the Triac 63 as shown in the drawings, and power from AC source 13 is applied to said Triac and power supply 91, there will be a maximum DC control voltage appearing on line 16 due to the fact that stator current has not been previously providing inrush current pulses at a 120 Hz rate to demodulator 17. This high DC voltage on line 16 causes wave modifier 15 to turn on solid state switch 14 without delay, and the stator winding 11 of motor 10 receives full waves of 60 cycles causing rotor 12 thereof to commence rotation.

As motor 10 accelerates with full sine waves of power applied, the pulse parameter modulation output of bridge 24, produced by load-responsive characteristics of stator 11 inrush current at current zero crossings, begins altering the conduction of transistor 40 in accordance with the previous adjustment of demodulator 17. Above about 95% of synchronous speed, transistor 40 therefore operates to reduce the DC control voltage, which is produced across capacitor 90 and appears on line 16, in proportion to the mechanical load on the motor, with the result that a capacitor 48 connected to said line 16 does not have sufficient time to receive a full charge before it is discharged periodically by a transistor 52 when the motor load is less than the motor's maximum rating. Consequently, at said lesser loads, the voltage across capacitor 48 is not sufficiently high at the beginning of each voltage alternation of power source 13 to immediately reach the conduction threshold of transistor 55 and to start operation of wave modifier 15. The result is that Triac 63 of solid state switch 14 does not start conducting at the beginning of the voltage cycle from AC power source 13, but begins conduction later, i.e., at a time subsequent to the commencement of the sine wave voltage cycle from power source 13.

Triac 63 breaks off conduction when the current passing through it drops near zero. This occurs slightly after the voltage wave passes through zero, due to the inductance of stator winding 11 delaying the current wave. The energy which is actually delivered to the motor stator 11 by Triac 63 when the motor is running with zero load accordingly represents only a small part of the sine wave from AC power source 13, e.g., typically less than 3 milliseconds of each 8.33 millisecond alternation period when power source 13 operates at a frequency of 60 Hz per second.

As motor load increases above zero load, stator inrush current induced pulse parameter modulation becomes indicative of reduced motor efficiency due to inadequate stator excitation. The improved current demodulator 17 monitors and responds to the magnitude and rate of change in said decrease in motor efficiency by proportionately increasing the rate and magnitude of increase in the DC control voltage controlling wave modifier 15, thereby causing solid state switch 14 to couple increased power to stator 11 as necessary to maintain optimum efficiency of motor 10.

Under severe overload or stalled rotor conditions, the improved current demodulator 17 couples voltage pulses of an amplitude proportional to the degree of excessive current in stator 11 via line 17a to motor protector 100. If said excess current continues beyond the input response-time set by variable resistor 117, motor protector 100 inhibits wave modifier 15. Thus, solid state switch 14, receiving no further gate pulses from wave modifier 15, turns off at the next stator current zero crossing and remains off until motor protector 100 is reset as described. When heat sensor 124 is employed with motor 10 and connected to motor protector 100 via lines 120 and 122, a temperature proportional voltage in excess of the threshold selected by variable resistor 115 will cause motor protector 100 to inhibit wave modifier 15 as previously described, thereby protecting motor 10 from continued excess temperature operation.

Simultaneous input of excess stator current derived pulses on line 17a and a voltage magnitude indicative of high motor temperature on line 112, as additively summed by capacitor 113, will initiate more rapid action of motor protector 100 than either input alone, thereby effecting a higher degree of motor protection and a decreased probability of motor system catastrophic failure.

Thus, due to the closed loop feedback referenced to motor operating efficiency that becomes controllingly operative near synchronous speed and which includes a rotor mechanical load, when present, the inherent electromechanical properties of the controlled motor serve to increase or decrease the input power coupled from AC power source 13 as necessary to maintain energy-efficient operation with all loads and rates of increase in said loads between zero and maximum motor load and/or variations in the magnitude of the source voltage supplied by the AC power source. Additionally, the projectable life of motor 10, a standard induction motor, is increased by an improved energy-saving AC power control system which protects itself and the controlled motor from excessive current and/or high temperature resulting from adverse conditions of operation and environment.

While I have thus described preferred embodiments of the present invention, many variations will be apparent to those skilled in the art. For example, circuit means other than discrete components may be employed in the various circuits of current demodulator 17, wave modifier 15 and motor protector 100. More specifically, and as an example, the inhibit bistable multivibrator of FIG. 2 could employ a commercially available integrated circuit with this function; an integrated circuit multiple input gate could be employed for inhibit command switch 111; and an integrated circuit gate could be employed for inhibit switch 116. Likewise, motor protection and energy savings control of solid state AC power switching means can be achieved with microprocessor technology implemented by associated hardware and software means that rely upon the method of the present invention. By way of specific example, the monitoring and development of control signals suitable for control of wave modifier 15 in response to the stator inrush current parameter modulation of transformer 20 may be accomplished by said microprocessor means in place of the discrete component arrangement of current demodulator 17 and motor protector 100 in FIG. 2.

It must, therefore, be understood that the foregoing description is intended to be illustrative only and not limitative of the present invention, and all such variations and modifications as are in accordance with the principles described are meant to fall within the scope of the appended claims.

Having thus described my invention, I claim:

1. A power control system comprising an AC induction motor having a rotor and a stator winding, a sine wave power supply, switching means coupling said power supply to said stator winding to effect rotation of said rotor, said switching means including a controllable wave modifier for applying varying fractions or complete cycles of the sine waves of voltage from said power supply to said stator winding in accordance with the inherent electromechanical properties of said motor and the energy requirements imposed on said motor by the rotor load at any given moment, means for monitoring the magnitude of inrush current to said stator winding for only a brief interval of time each time the current in said stator winding increases from zero, said brief time interval being a small fraction of each alternation from said power supply, said monitoring means including threshold means for providing an output pulse only when the magnitude of said inrush current is in excess of a predetermined value, pulse integrating means for integrating said output pulses, said pulse integrating means being operative to generate a control signal in response to peresistent occurrence of said output pulses for a time period in excess of a predetermined time period, and control means responsive to generation of said control signal by said pulse integrating means for inhibiting said switching means from coupling said power supply to said stator winding thereby to de-energize said stator winding.

2. The power control system of claim 1 wherein said monitoring means includes a transformer having a primary winding connected to said stator winding, rectifier means coupled to the secondary winding of said transformer, said threshold means comprising a zener diode coupled to the output of said rectifier means for producing said output pulse, said pulse integrating means comprising an R-C circuit coupled to said zener diode for accumulating a charge on the capacitor of said R-C circuit upon the occurrence of pulses from said zener diode, and said control means comprising a solid state switch whose state of conduction changes when the magnitude of the charge on said capacitor accumulates to a value in excess of a predetermined value.

3. The power control system of claim 2 including a temperature sensor adjacent said motor for monitoring the temperature of said motor, and means responsive to said temperature sensor for varying the charge which is accumulated by said capacitor whereby the operation of said control means is jointly responsive to the magnitude of said stator inrush current and to the temperature of said motor.

4. The power control system of claim 3 including adjustable resistor means between said temperature sensor and said capacitor for adjusting the extent to which the temperature of said motor varies the charge which is accumulated by said capacitor.

5. The power control system of claim 1 including a temperature sensor adjacent said motor for monitoring the temperature of said motor, and means responsive to an output from said temperature sensor indicative of excessive motor temperature for inhibiting said switching means from coupling said power supply to said stator winding.

6. The power control system of claim 1 wherein said control means is operative to de-activate said wave modifier.

7. The power control system of claim 6 including reset means coupled to said control means for reactivating said wave modifier.

8. The power control system of claim 7 wherein said reset means is manually operable.

9. In a power control system of the type comprising an AC induction motor having a rotor and a stator winding, a sine wave power supply for energizing said stator winding to effect rotation of said rotor, a motor current demodulator circuit coupled to said stator winding for monitoring operating efficiency-related parameters of the inrush current to said stator winding for only a brief interval of time following each inrush from zero of the current in said stator winding, each such brief time interval being a small fraction of an alternation from said power supply, said demodulator circuit including means responsive to said monitored operating efficiency related parameters for generating an output control signal whose magnitude is dependent upon said efficiency-related inrush current parameters, switching means responsive to said output control signal from said motor current demodulator circuit for controlling the energization which is supplied by said power supply to said stator winding, said switching means including a controllable wave modifier for applying varying functions or complete cycles of the sine waves of voltage from said power supply to said stator winding in accordance with the inherent electromechanical properties of said motor and the energy requirements imposed on said motor by the rotor load at any given moment, control means coupled to said switching means for selectively inhibiting operation of said switching means thereby to de-energize said stator winding, and means responsive to at least one selected operating parameter of said motor for causing said control means to inhibit operation of said switching means when the magnitude of said selected operating parameter is indicative of motor overload or stalled rotor conditions.

10. The power control system of claim 9 wherein said selected operating parameter is the temperature of said motor.

11. The power control system of claim 9 wherein said selected operating parameter is the magnitude of said inrush current to said stator winding.

12. The power control system of claim 9 wherein said last-named means is jointly responsive to the operating temperature of said motor and the magnitude of said stator inrush current during a succession of said brief time intervals.

13. The power control system of claim 9 wherein said last-named means includes means in said motor current demodulation circuit responsive to the magnitude of said stator inrush current during said brief time interval for producing an electrical pulse when said stator inrush current magnitude is in excess of a predetermined threshold value, and means responsive to persistent occurrence of said electrical pulses for an interval of time in excess of a predetermined time interval for causing said control means to inhibit operation of said wave modifier.

14. The power control circuit of claim 9 wherein said switching means comprises a solid state switch located between said sine wave power supply and said stator winding, said controllable wave modifier including a multivibrator for controlling the conduction time of said solid state switch, said control means being coupled to said multivibrator for selectively preventing operation of said multivibrator.

15. In a power control system of the type comprising an AC induction motor having a rotor and a stator winding, a sine wave power supply for energizing said stator winding to effect rotation of said rotor, a motor current demodulator circuit coupled to said stator winding for monitoring operating efficiency-related parameters of the inrush current to said stator winding for only a brief interval of time following each increase from zero of the current in said stator winding, said demodulator current including signal integration means operative to generate an output control signal whose magnitude is dependent upon said efficiency-related inrush current parameters, switching means responsive to said output control signal from said motor current demodulator circuit for supplying varying fractions or complete cycles of the sine waves of voltage from said power supply to said stator winding to control the energization which is supplied by said power supply to said stator winding in accordance with the inherent electromechanical properties of said motor and the energy requirements imposed on said motor by the rotor load at any given moment, said signal integration means having a predetermined time constant when the load on said motor is changing comparatively slowly, and circuit means responsive to the magnitude and rate of change of the load on said motor for automatically decreasing the time constant of said signal integration means when the load on said motor increases at a rate in excess of a predetermined rate of change.

* * * * *